Oct. 7, 1952

R. B. WALSH ET AL 2,613,014

MILK CAN COVER

Filed May 26, 1950

Richard B. Walsh
Robert J. Sims
INVENTORS

Patented Oct. 7, 1952

2,613,014

UNITED STATES PATENT OFFICE 2,613,014

MILK CAN COVER

Richard B. Walsh, Spooner, Wis., and
Robert J. Sims, St. Paul, Minn.

Application May 26, 1950, Serial No. 164,438

1 Claim. (Cl. 220—55)

This invention relates to improvements in covers for milk cans.

An object of this invention is to provide an improved closure for a conventional milk can which is very easily removed and attached to the conventional milk can and yet operates in a capacity of a closure for the milk can in a completely satisfactory manner.

Another object of this invention is to improve the conditions under which milk cans are handled by avoiding the possibility of the friction type closures from becoming fastened too tightly in place and by avoiding the discomfort of employing cam or other type latches and yet by providing a closure which will serve the purpose effectively but which will not interfere with the stacking or handling of cans.

Other objects and features of importance will become apparent in following the description of the illustrated form of the invention.

Figure 1:
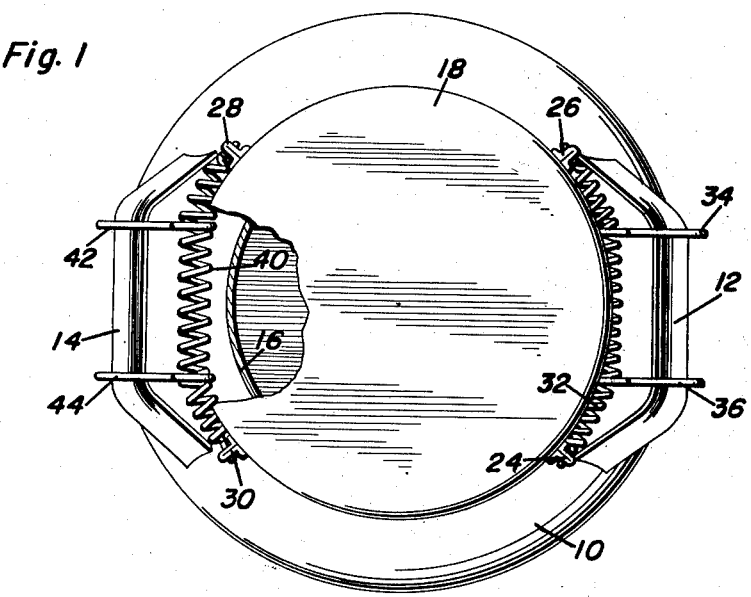
Figure 1 is a top view of the device, portions being broken away in section to illustrate internal details.
Figure 2:
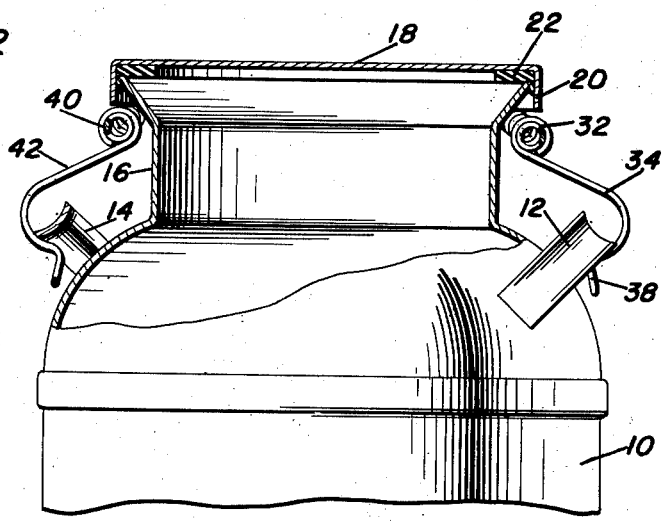
Figure 2 is an elevational side view showing a milk can fragmentarily, portions thereof being broken away to illustrate detail of construction.

In carrying out the invention there is illustrated a conventional milk can upper portion 10 with usual and conventional handles 12 and 14 respectively. These handles are located adjacent the neck 16 of the can but spaced therefrom as is conventional.

A closure consisting of an upper flat plate 18 with a circular skirt 20 depending therefrom is disposed on the throat 16. A replaceable gasket 22 is disposed on the upper and outer edge of the throat and seats within the closure. The gasket serves the usual purpose of sealing in order to prevent various waste matter, as water, dust and dirt from entering the milk can while the closure is in place.

A pair of brackets 24 and 26 are arranged on one side of the skirt 20, and a pair of brackets 28 and 30 are arranged on the other side of the skirt. The brackets 24 and 26 support the ends of a spring 32 or other equivalent resilient device. The spring 32 has a pair of hooks 34 and 36 carried thereby, each hook being provided with an eye which encircles the spring 32 and a latch or hook member 38 at the opposite end adapted to releasably fasten beneath the handle 12. The fastening end of the hook member is V-shaped so that it slides under the handle 12 and so that it is held in place by the opposing force of the spring 32.

An identical assembly including a spring 40, and hook members 42 and 44, is provided at the opposite end of the closure and is supported by the brackets 28 and 30.

In operation the closure is simply rested on the neck of the milk can and the hook fastened under the handles 12 and 14. To remove the device, the hooks are simply lifted and the closure removed.

Having described the invention, what is claimed as new is:

In a milk can which has a pair of handles and a neck, a closure comprising a plate disposed on said neck and having a skirt depending from the periphery of said plate, means carried by said plate and releasably connected with the handles for holding said plate in place on said neck, said means comprising a first pair of brackets spaced from each other and secured to said skirt, a second pair of brackets spaced from each other and secured to said skirt, a first spring secured at its ends to said first pair of brackets, a second spring secured at its ends to said second pair of brackets, both of said springs extending peripherally of said skirt, hooks extending generally axially of the milk can and pivotally secured at their upper ends to said springs intermediate the ends of said springs, and said hooks having V-shaped members at their opposite ends, one side of which releasably engages the lower surface of the handles of the can.

RICHARD B. WALSH.
ROBERT J. SIMS.

REFERENCES CITED

The following references are of record in the file of this patent:

UNITED STATES PATENTS

| Number | Name | Date |
|---|---|---|
| 336,730 | McFarland | Feb. 23, 1886 |
| 623,957 | Hamill | Apr. 25, 1899 |
| 972,000 | Hafer | Oct. 4, 1910 |
| 1,202,323 | Schulte | Oct. 24, 1916 |
| 1,610,114 | Wheeler | Dec. 7, 1926 |
| 1,703,800 | Umberger | Feb. 26, 1929 |
| 1,898,262 | Packer | Feb. 21, 1933 |
| 2,525,251 | Willard | Oct. 10, 1950 |

FOREIGN PATENTS

| Number | Country | Date |
|---|---|---|
| 199,742 | Switzerland | Sept. 15, 1938 |
| 265,121 | Great Britain | May 19, 1927 |
| 351,916 | Germany | Apr. 18, 1922 |